V. LANCIA.
TRANSMISSION GEAR FOR MOTOR CARS.
APPLICATION FILED JUNE 4, 1912.
1,085,869.
Patented Feb. 3, 1914.
2 SHEETS—SHEET 1.
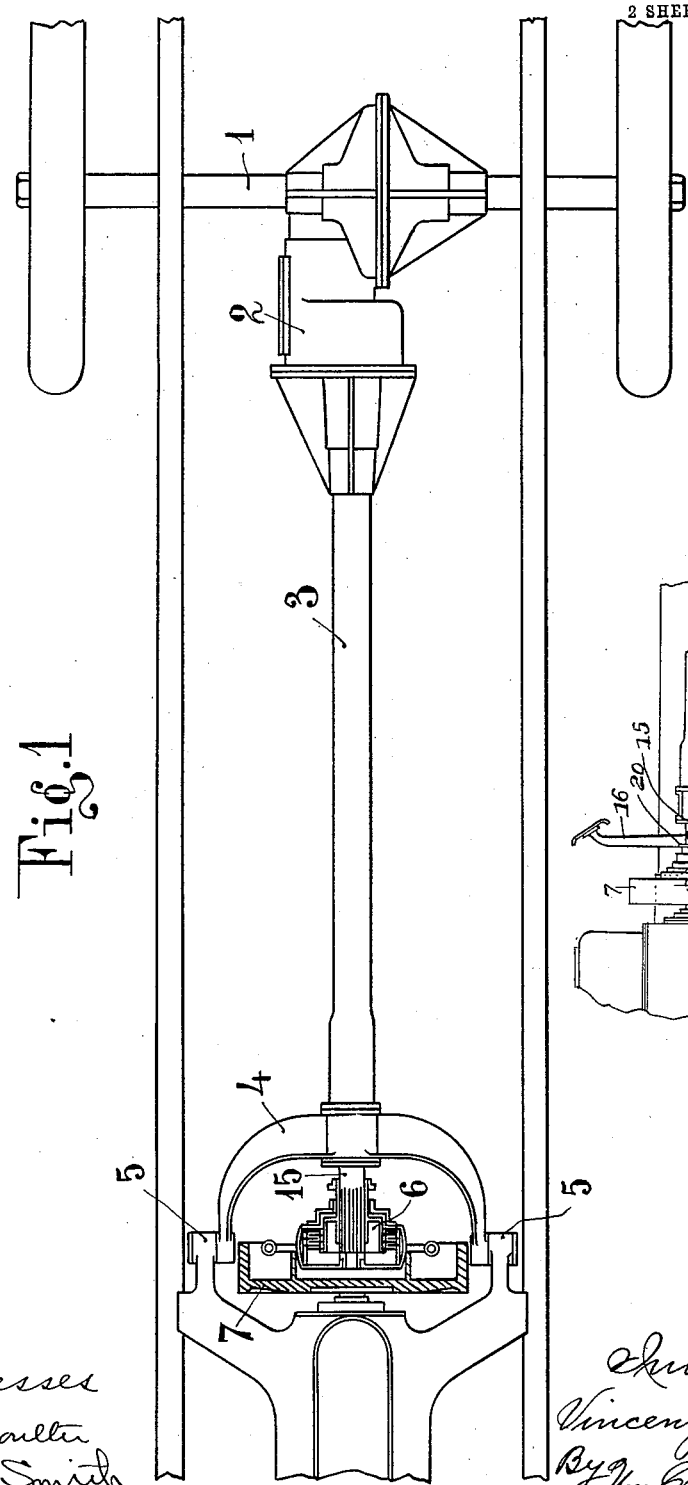
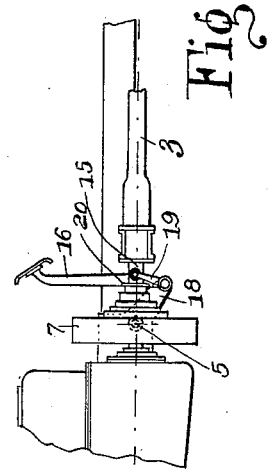
Witnesses
W. K. Boulter
R. B. Smith
Inventor
Vincenzo Lancia
By Wm. E. Boulter.
Attorney V. LANCIA.
TRANSMISSION GEAR FOR MOTOR CARS.
APPLICATION FILED JUNE 4, 1912.
1,085,869.
Patented Feb. 3, 1914.
2 SHEETS—SHEET 2.
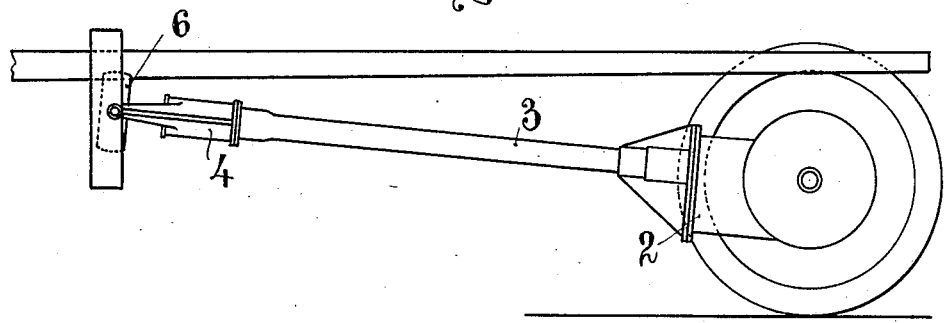
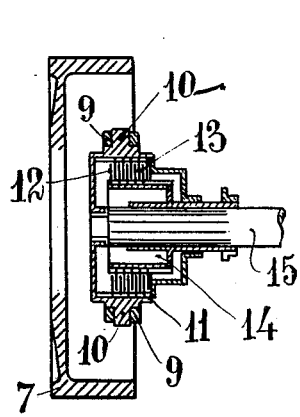
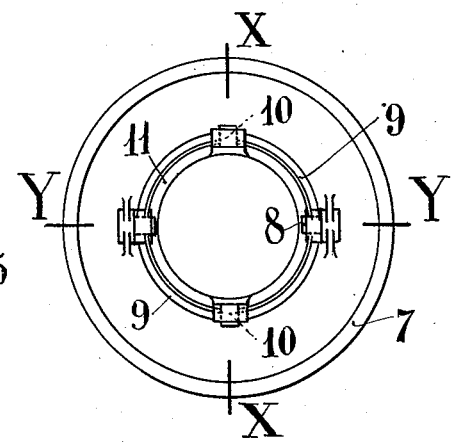
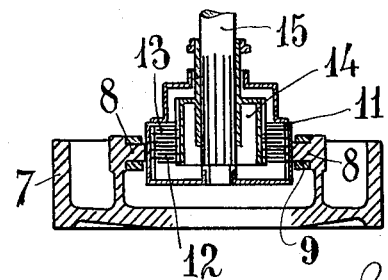
Witnesses:
H. K. Boulter
R. B. Smith
Inventor:
Vincenzo Lancia
By Wm. E. Boulter
Attorney

UNITED STATES PATENT OFFICE.

VINCENZO LANCIA, OF TURIN, ITALY.

TRANSMISSION-GEAR FOR MOTOR-CARS.

1,085,869.  Specification of Letters Patent.  Patented Feb. 3, 1914.

Application filed June 4, 1912. Serial No. 701,642.

*To all whom it may concern:*

Be it known that I, VINCENZO LANCIA, a subject of the King of Italy, residing at Turin, in Italy, have invented certain new and useful Improvements in Transmission-Gears for Motor-Cars, of which the following is a specification.

This invention relates to an improvement in the fitting of the transmission gear in motor cars, more particularly those in which the change speed gear is arranged on the rear axle, and consists in the said rear axle being rigidly connected, without any joint making oscillations possible, to the clutch which in that way is forced to oscillate with the rear axle.

A construction of the invention is illustrated in the accompanying drawing in which—

Figure 1 shows diagrammatically a plan of the chassis of a car, Fig. 2 is a side elevation on a reduced scale, Fig. 3 a front elevation of the fitting of the clutch and Figs. 4 and 5 are cross-sections of Fig. 3 respectively on lines X—X and Y—Y. Fig. 6 shows in detail the clutch controlling gear.

As will be seen in Figs. 1 and 2, the rear axle 1 on which is mounted the change speed gear 2, is provided as usual with the tube 3 called the "radius rod" which at its opposite end is provided with a fork 4. This fork is pivoted at the sides on transverse pivots 5 secured to the frame of the engine, and consequently to the chassis of the car.

The clutch 6 which may be of any desired type, is pivoted so as to be able to oscillate on the axis common to the two pivots 5 on which is mounted the fork 4. The outer casing of the clutch is connected to the driving shaft, for instance to the fly wheel, by means of springs so as to form at the same time a universal joint, or of the type shown in Figs. 3–5, in which 7 indicates the fly wheel keyed to the driving shaft and provided at two diametrically opposite points with two pivot pins 8 on which is pivoted a ring 9. The casing or box 11 of the clutch is in its turn pivoted to said ring by means of pins 10 arranged at an angle of 90° relatively to pins 8. The clutch may conveniently be a disk clutch, comprising a series of disks 12 keyed to its inner wall, while the other series of the disks 13 are keyed to the hub 14 secured to the driven shaft 15 concentric with the tube 3 and transmitting the rotation to the change speed gear.

The controlling of the clutch is effected as usual by means of a pedal lever 16 (Fig. 6) pivoted at 17 on a bracket 18 and connected to an arm 19 provided with a fork or other suitable part able to act on the collar 20 rigidly secured to the inner half 14 of the clutch. Thus the disengagement is effected in the usual way by depressing the pedal, as the arm 19 pushes the inner half 14 of the clutch into such a position that the disks 12 are thrown out of contact.

It will be readily understood from the foregoing that, when the rear axle 1 is forced to oscillate relatively to the chassis owing to irregularities of the ground or variations of the weight, the driven shaft with the clutch 6 mounted on the same, will oscillate with the tube 3 about the axis of the pivots 5. In that way, the driven shaft is rigid and in a single piece between the change speed gear and the clutch which need merely be mounted with an elastic or Cardan joint, so as to be able to oscillate in any direction and to follow the oscillations of the rear axle during the rotation of the shaft.

What I claim as my invention and desire to secure by Letters Patent is:—

In a transmission gear for motor-cars, a rear axle, a change-speed gear casing rigidly connected thereto, a radius rod rigidly connected to said casing, and supported pivotally at its forward end, a driving shaft within said radius rod, a clutch member carried by the forward end of said shaft, an outer clutch member, and means comprising a universal joint concentric with the pivots of the radius rod for driving said outer clutch member.

In testimony whereof I have signed my name to this specification in the presence of two subscribing witnesses.

VINCENZO LANCIA.

Witnesses:
JOCELYN GOUBEYRAN,
CARLO TORTAY.

Copies of this patent may be obtained for five cents each, by addressing the "Commissioner of Patents, Washington, D. C."